United States Patent
Chamming's (10) Patent No.: US 8,314,846 B2
(45) Date of Patent: Nov. 20, 2012

(54) METHOD FOR CORRECTING THE SPATIAL NOISE OF A MATRIX IMAGE SENSOR

(75) Inventor: Gilles Chamming's, Grenoble (FR)

(73) Assignee: Comissariat A l'Energie Atomique, Paris (FR)

( * ) Notice: Subject to any disclaimer, the term of this patent is extended or adjusted under 35 U.S.C. 154(b) by 479 days.

(21) Appl. No.: 12/594,187

(22) PCT Filed: Mar. 26, 2008

(86) PCT No.: PCT/EP2008/053516
§ 371 (c)(1),
(2), (4) Date: Mar. 19, 2010

(87) PCT Pub. No.: WO2008/125435
PCT Pub. Date: Oct. 23, 2008

(65) Prior Publication Data
US 2010/0231756 A1  Sep. 16, 2010

(30) Foreign Application Priority Data
Mar. 30, 2007 (FR) .................................. 07 02351

(51) Int. Cl.
*H04N 5/228* (2006.01)

(52) U.S. Cl. ..................... 348/222.1; 348/340; 348/341; 348/343

(58) Field of Classification Search ............... 348/222.1, 348/340, 341, 343
See application file for complete search history.

(56) References Cited

U.S. PATENT DOCUMENTS

| 4,231,065 A * | 10/1980 | Fitch et al. ...................... 348/28 |
| 6,151,417 A | 11/2000 | Florent |
| 7,734,110 B2 * | 6/2010 | Bosco et al. .................. 382/264 |
| 2007/0047834 A1 | 3/2007 | Connell |
| 2008/0002903 A1 * | 1/2008 | Mitchell et al. ............... 382/265 |

FOREIGN PATENT DOCUMENTS
EP 0751483 A 1/1997
* cited by examiner

*Primary Examiner* — Yogesh Aggarwal
(74) *Attorney, Agent, or Firm* — LaRiviere, Grubman & Payne, LLP (57) ABSTRACT

The invention relates to matrix image sensors, and it relates more particularly to a method for correcting the spatial noise generated by the dispersion of the physical properties of the different individual sensitive dots, or pixels, of the matrix. For each pixel, in an individual electronic circuit associated with the pixel, a recursively digital method is used to determine an approximate value ($M_{ij,n}$) of an average of the signal $S_{ij,n}$ obtained from the pixel during this large number of images; the signal obtained from each pixel is corrected according to the determined approximate average value and according to a reference average value (M0), and a corrected signal $S^*_{ij,n}$ is transmitted from the circuit associated with the pixel.

10 Claims, 3 Drawing Sheets

METHOD FOR CORRECTING THE SPATIAL NOISE OF A MATRIX IMAGE SENSOR

PRIORITY CLAIM

This application claims priority to PCT Patent Application Number PCT/EP2008/053516, entitled Method for Correcting the Spatial Noise of a Matrix Image Sensor, filed on Mar. 26, 2008.

FIELD OF THE INVENTION

The invention relates to matrix image sensors, and it relates more particularly to a method for correcting the spatial noise generated by the dispersion of the physical properties of the different individual sensitive dots, or pixels, of the matrix. The spatial noise is particularly significant in the case of infrared image sensors, whether these are sensors with photovoltaic elements, which measure currents generated by the infrared radiation, or sensors with bolometric elements, which measure a temperature resulting from heating produced by the radiation.

BACKGROUND OF THE INVENTION

The spatial noise generates a spurious image which degrades the wanted image, or even renders it unusable: assuming that the scene observed by the sensor is an image of uniformly average luminance, the sensor supplies a non-uniform image, which is unacceptable if this non-uniformity exceeds a certain degree; furthermore, the observed image depends on the level of this uniform luminance, which renders this noise all the more of a nuisance since the difference in behavior of two pixels depends on the luminance that they receive.

In practice, the behavior of the pixels differs from one pixel to another not only regarding the signal level produced for a reference luminance level, but also regarding the slope of growth and the general appearance (for simplicity: the curvature) of the response curve of the pixel according to the luminance.

To minimize the spatial noise generated in this way in a matrix sensor, it has already been proposed to record the output signal levels from the different pixels for a uniform image of given luminance and to individually offset the signal level of each pixel for all the pixels to be brought to one and the same reference (first order correction). It has also been proposed to record the levels for two uniform luminance levels, in order to correct not only the level offset but also the slope of variation (second order correction).

These methods require a manual calibration based on one or two uniform images exhibiting reference luminances, which is problematic; moreover, this calibration must be redone if the spatial noise drifts over time.

Finally, it has been proposed to perform corrective calculations of each of the dots of the collected image, based on the observation of a large number of successive images, by assuming that the statistical average and the statistical variance of the light levels received by a pixel is the same for all the pixels because of the diversity of the images received over time. Thus, the average of the signals received in time is calculated for each pixel and a correction of the current signal from the pixel is performed to offset the current level by a value corresponding to the deviation between the average detected for this pixel and a reference average value common to all the pixels. This brings the average level of all the signals to the same reference value.

Similarly, the variance is calculated for each pixel over a large number of images, this variance being somewhat representative of an approximation of the slope of the curve of variation of the signal level according to the luminance, and a gain correction is applied to the current signal variations, the correction being the deviation between the calculated variance and a reference variance common to all the pixels. This brings the slope of variation of each pixel to one and same reference value.

This solution is very advantageous since it requires no calibration based on patterns.

However, these calculations are very cumbersome since they require a large number of images to be collected, all of them to be stored, average calculations to be done for each pixel over this large number of images, and variance calculations on each pixel. In practice, this can be performed only by a powerful computer, on a series of prestored images. It would not be possible to collect and directly process the image in the photographing camera. Consequently, although this solution can be used in theory to process images off line, it is not at all applicable for an instantaneous shot.

The invention proposes a solution to overcome this difficulty.

SUMMARY OF THE INVENTION

According to the invention, an automatic method is proposed for calibrating the response of the different pixels of a matrix sensor to eliminate the spatial noise due to the non-uniform response of the different pixels. The method according to the invention is a method of processing signals obtained from pixels of a matrix image sensor, characterized in that it comprises the following steps:

the signal obtained from each pixel is collected during a large number of successive images;

for each pixel, in an individual electronic circuit associated with the pixel, a recursive digital method is used to determine an approximate value of an average of the signal obtained from the pixel during this large number of images;

the signal obtained from each pixel is instantaneously corrected according to the determined approximate average value and according to a reference average value common to all the pixels, a corrected signal is transmitted from the circuit associated with the pixel.

A recursive digital method should be understood to be a method of calculating a function $F_N(x_1, x_2, x_3, \ldots x_n \ldots x_N)$ of N variables $x_n$, of rank n varying from 1 to N, in which the starting point is a value $F_n$ found for this function by using the first n variables and the value $F_{n+1}$ is calculated for n+1 variables by a function of $F_n$ and of the added variable $x_{n+1}$: $F_{n+1} = R(F_n, x_{n+1})$.

Such a method progressively culminates in the calculation of $F_N$ and is not limited by the value of N since it can continue as N increases.

The approximate average is obtained preferably by adding to a previously obtained average a fraction of the deviation between the value of the current signal corresponding to an image and the average previously obtained from the preceding images.

The corrected signal can then be obtained by adding to the current signal the difference between the reference average and the calculated average.

It is also possible to calculate the approximate average in an indirect manner, but still recursively, from the signal previously corrected by an estimation of this average. The average related to the reference value is determined in a recursive manner, in other words, the difference between the average and the reference average is evaluated. For this, an estimation of the average deviation is calculated, and this estimation is added to the current signal to obtain a corrected signal, the recursive calculation of the estimation being performed by adding to a previously calculated estimation a fraction of the difference between the reference average value and the corrected signal.

The signal obtained from the pixel is then corrected by adding to it the recursively calculated difference.

Another way of calculating an approximate average consists in detecting the high and low limit values taken by the signal obtained from the pixel during the large number of images, in determining a median between these high and low limit values, and in correcting the signal obtained from the pixel by adding to it the difference between the approximate average value calculated in this way and the reference value.

In this case, the high limit value can be obtained recursively by the following algorithm:
  if the value of the signal from the pixel for the current image is greater than the high limit value, the high limit value is modified to add to it a fraction of the difference between the value of the signal and the limit value;
  if the value of the signal from the pixel is less than the limit value, a fraction of the difference between the high and low limit values is subtracted from this value.

For the low limit value, the procedure is symmetrical.

In addition to the additive corrections that have just been mentioned, it is also possible to provide at pixel level a multiplicative correction that uses a multiplying coefficient which modifies the slope of variation of the signal according to the luminance; the multiplying coefficient is the ratio between a reference deviation and the deviation observed between the high and low limit values.

In addition to the correction method that has just been summarized, the invention relates to a matrix image sensor, comprising, for each pixel, an individual digital circuit associated with the pixel, this individual circuit comprising means for recursively calculating an approximate value of an average of the signal obtained from the pixel during a large number of preceding images, means for correcting the signal obtained from the pixel according to the determined approximate average value and according to a reference average value common to all the pixels, and means for transmitting a corrected signal from the circuit associated with the pixel.

The associated individual circuit and an individual photodetector supplying the signal to be corrected for this pixel can be placed in one and the same area within a matrix of pixels.

However, it is also possible to provide for the image sensor to be organized in two separate matrices, one of the matrices being reserved for photographing (matrix of individual photodetectors) and the other for signal correction (matrix of individual correction circuits each associated with a pixel).

BRIEF DESCRIPTION OF THE DRAWINGS

Other features and benefits of the invention will become apparent from reading the detailed description that follows and which is given with reference to the appended drawings in which.

DESCRIPTION OF PREFERRED EMBODIMENTS

The invention starts from a postulate that the statistical time distribution of the luminances is the same for all the pixels of the image. In particular, the average luminance level that will have been seen by the pixels of the matrix will be the same for all the pixels; also, the extreme luminance levels (minimum and maximum) have good chances of being the same.

If the starting postulate on which the invention is based is born out, each of the pixels can be corrected in an extremely satisfactory manner by calculating their average and by correcting each signal by the deviation between the average found and a reference value common to all the pixels. If this postulate is only approximately born out, for example because the average has not been calculated over sufficiently large numbers of images, the spatial noise will in any case have been considerably improved without requiring any manual calibration and without using calibration scenes that have reference luminances.

Calculating the average pixel by pixel for a large number of images is a very cumbersome process. The invention proposes making a calculation at the level of each image pixel that is simplified and approximate, which is therefore not a true average calculation, but which supplies a result that is almost equivalent from the view point of the desired objective; with this approximate calculation, a correction is performed at the pixel level so as to extract a corrected signal directly and instantaneously.

The calculation and the correction at the pixel level can be done either in the detection matrix itself technology permitting (the electronic calculation circuit associated with the pixel being in the immediate vicinity of a photodetecting element of the pixel) or in a matrix of associated circuits linked pixel to pixel to a matrix of photodetecting elements. In this second case, an associated calculation circuit of rank i,j in the circuit matrix, receives a signal to be corrected from a photodetecting element of rank i,j of the detection matrix and it supplies a corrected signal outside the sensor; the circuit hybridization techniques allow this association. In both cases, the signal obtained from the photodetector is corrected before the outside transmission, line by line, of a series of signals corresponding to a complete image.

Additive Correction by the Temporal Average of the Signals from a Pixel

The invention will be explained first of all in a simple example in which the spatial noise correction comprises only a signal reference level correction, to correct the signal from each of the pixels so that all the pixels supply one and the same signal level (after correction) for an average luminance level. This is an additive correction: to correct the signal received by a pixel, a correction value is systematically added or subtracted.

$S_{ij,n}$ denotes the signal level obtained from a pixel $P_{ij}$ of rank i by row and j by column, during an nth image of a series of successive images.

An (approximate) average $M_{ij}$ of the signal levels supplied by the pixel $P_{ij}$ is calculated for a series of N images, and this is used to correct the value of the signal $S_{ij,n}$ and supply a corrected value $S^*_{ij,n}$ to the user.

On each new image, an average $M_{ij}$ is recalculated, and it is this average that will be used to correct the signal obtained from a pixel for this image or for the next.

The correction applied to the signal $S_{ij,n}$ is a subtraction of the deviation between the average $M_{ij}$ and a reference value M0 common to all the pixels. The correction is therefore as follows: $S^*_{ij,n}=S_{ij,n}+M0-M_{ij}$.

Consequently, if a pixel statistically supplies a signal with an average value $M_{ij}$ that is not equal to the statistical average value M0 of the signals supplied by all the other pixels, it is considered that this pixel has however statistically received the same average luminance as all the others and it is therefore because of a different sensitivity that it supplies a different signal. It is corrected systematically by subtracting from it the deviation $M_{ij}-M0$.

Recursive Calculation to Obtain an Average $M_{ij}$

It is not easy to calculate an average $M_{ij}$ over very large numbers of samples since it entails calculating the sum of N samples and dividing this sum by N; for each new image the oldest sample must be eliminated and replaced by the new sample (which gives a sliding average over the last N samples received); this calculation is all the more cumbersome when N is higher; however, N has to be high for the invention to work well.

To instantaneously obtain a very good approximation of the average regardless of the value of N, a recursive procedure is used: from an average $M_{ij,n-1}$ previously calculated when n−1 images have been received in the series, a new average $M_{ij,n}$ is calculated from the signal $S_{ij,n}$ received with the nth image by adding to the old average just a fraction of the deviation between the signal $S_{ij,n}$ and the average $M_{ij,n-1}$.

$$M_{ij,n}=M_{ij,n-1}+(S_{ij,n}-M_{ij,n-1})/A$$

The average $M_{ij}$ used to correct the signal $S_{ij,n}$ is the last average stored $M_{ij,n}$ but it could also be the preceding average $M_{ij,n-1}$.

A is any number which in some way represents the number of samples to which the average relates. In practice, the greater the number A is, the more the recursive average can be considered to relate to a large number of samples; the reason for this is as follows; if A is great, the reception of a signal that is very different from the average reflects only very little on the average, exactly as is the case when the average relates to a very large number of samples. Conversely, if A is small, a sample that is different from the average reflects strongly on the average, precisely as if the average related to a small number of samples.

It is therefore very advantageous, for implementing the invention, to use a high number A since an average is approximated all the better over a large number; the only drawback is that, on starting, the average is established slowly. All the images previously taken by the camera will therefore be used to correct the spatial noise and each new image will have only a small impact on the average value. The signals corrected in the past have an impact that decreases over time according to an exponential weighing law that decreases from the most recent measurement and tends toward zero for the oldest measurements.

It will be understood that the recursive average $M_{ij}$ calculated in this way is not a true average, but it is the result of a kind of digital low-pass filtering, the result of which represents the equivalent of an average, serving the same purpose as an average for the purposes of spatial noise correction.

The number A can be a power of 2 because it is particularly easy, in an electronic digital calculation circuit, to divide the signal by a power of 2, bearing in mind that a division by a power 2 consists in a simple shifting of the rank of the bits.

Typically, the number A can be of the order of $2^8$ to $2^{14}$. If it is $2^{12}$, and if the image rate is 50 images per second, the time constant for establishing the average is a little more a minute.

In the practical implementation of the recursive calculation, it will be understood that the recursive calculation registers must, because of the division by the number $A=2^p$, include a sufficient number of bits to be able to accurately calculate the sum $S_{ij,n}+(S_{ij,n}-M_{ij,n-1})/2^p$, but the correction of the signal from the pixel $S^*_{ij,n}=S_{ij,n}+(M_{ij}-M0)$ will use only the high order bits of the register which contains the average value. In other words, if the signal obtained from the pixel is coded on 13 bits for example, the average will also be coded on 13 bits to be used for correction, but the calculation of this average will be done by a register that has a larger number of bits (all the more so when A is great), otherwise the recursive calculation will be very inaccurate.

Implementing the Recursive Calculation of the Average $M_{ij}$

Figure 1:
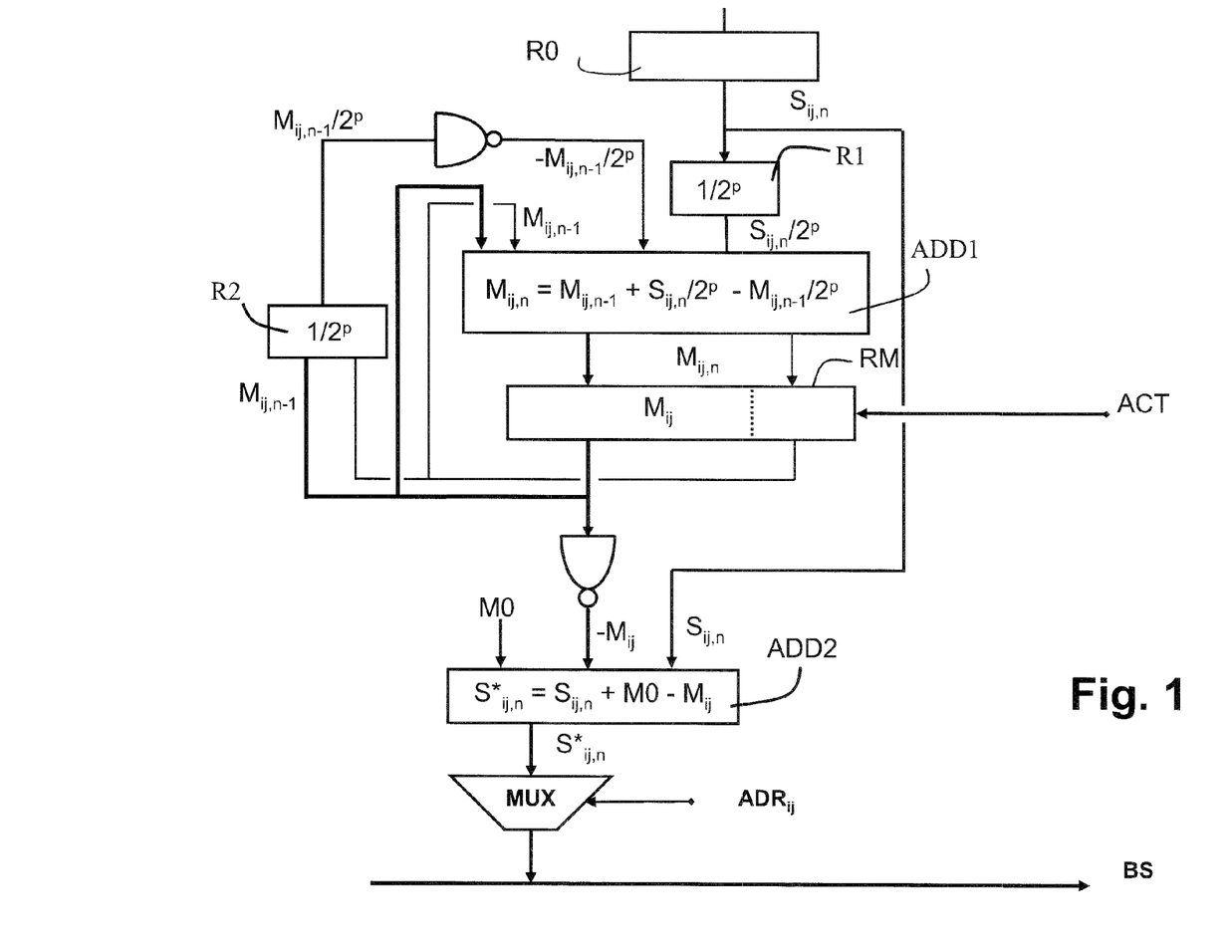
FIG. 1 represents the digital circuit for recursively calculating an approximate average value.

FIG. 1 represents an individual circuit, associated with a single pixel $P_{ij}$ of the photographing matrix, capable of correcting the signal obtained from this pixel from the approximate average of the signals obtained from this pixel over a large number of images. The circuit performs the recursive digital calculation indicated hereinabove. There are as many circuits as there are pixels.

The digitized signal $S_{ij,n}$ obtained from the pixel $P_{ij}$ and corresponding to the nth image is contained in an input register R0. The corrected signal $S^*_{ij,n}$ leaves via an output bus BS.

The value of the signal $S_{ij,n}$ is divided by $2^p$, for example by applying the output from the register R0 to a register R1 whose function is to offset the output bits from the register R0 by p positions to the right, which is equivalent to a division by $2^p$. The number p is such that $A=2^p$, A being the quantity used for the recursive calculation described previously.

The output from the register R1 is applied to a first input of an adder ADD1. The result of this offset by p bits is that the lowest order bit applied by this input to the adder is the bit of rank p+1 of the signal $S_{ij,n}$. The adder receives a value $S_{ij,n}/2^p$ on this input.

The adder ADD1 also receives the value $M_{ij,n-1}$ currently present in an average value register RM, and it also receives this same value divided by $2^p$. The adder ADD1 performs the addition $M_{ij,n}=M_{ij,n-1}+(S_{ij,n}-M_{ij,n-1})/2^p$ in accordance with the previous explanation. In other words, it updates the average $M_{ij}$ by adding to it the difference, divided by $2^p$, between the current signal and the preceding average value.

To obtain the value $M_{ij,n-1}/2^p$, a register R2, similar to the register R1, can be placed at the output of the register RM; the register R2 stores a content obtained from RM but offset by p bits to the right; the result of this is that it is the bit of rank p+1 of the average $M_{ij,n-1}$ that becomes the low order bit that will be applied to the adder. Here too, that amounts to dividing $M_{ij,n-1}$ by $2^p$.

At the output of the register R2, it is possible to place a digital inverter which, from the value $M_{ij,n-1}/2^p$, produces the opposite value $-M_{ij,n-1}/2^p$. The digital inversion is done based on the one's complement, which is very easy to perform.

The detail of the adder ADD1 is not represented; since three values are added, two cascaded individual adders are in theory required.

The average value register RM is reupdated on each new image to take the new value $M_{ij,n}$. It therefore includes an updating input ACT. The updating takes place, for example, at the end of an image exposure time, for all the pixels at once. After updating, the average value register RM contains an average value $M_{ij}$ which can be used to correct the signal $S_{ij,n}$.

The correction is done in a second adder ADD2 which receives the uncorrected signal $S_{ij,n}$, the output from the register RM, and the average set point value M0 common to all the pixels, and which performs the addition $$S^*_{ij,n} = S_{ij,n} + M0 - M_{ij,n}$$

The adder ADD2 then performs an addition and a subtraction. Here again, the subtraction conventionally consists in adding the twos complement of the value to be subtracted. An inverter is represented between the register RM and the adder to indicate that the opposite of the average $M_{ij}$ must be added.

The result of the addition, that is to say the corrected signal $S^*_{ij,n}$ is supplied by the adder ADD2, through a multiplexer MUX controlled by an address bus. The corrected signal is sent only if the address $ADR_{ij}$ of pixel $P_{ij}$ arrives via the address bus. The multiplexer handles the serializing on the output bus BS of the successive signals corresponding to each pixel.

It will be noted that this recursive average calculation method requires the adder ADD1 and the register RM to be able to add values with a binary resolution greater than that of the signal and of the average used at the end of calculation to correct the current signal. In practice, to calculate $M_{ij}$, a small value which is $(S_{ij} - M_{ij})/2^p$ must be added to a current value of $M_{ij}$ and the recursive calculation would be meaningless if this small value were not calculated with a precision greater than the precision of the signal.

This is why the output from the register RM is represented in the form of a high order bus and a low order bus, and the two buses are applied to the input of the adder ADD1. However, only the high order bus is applied to the second adder ADD2, the latter receiving inputs that have the resolution of the received signal but not a higher resolution.

Implementation with Calculation of the Average of Corrected Signals $S^*_{ij,n}$ Rather than calculate the average $M_{ij}$ of the signals obtained from the pixels, to compare it to the desired common average M0 and correct the signals so that the corrected signals have an average that is as close as possible to M0, it is also possible to analyze the average of the corrected signals, which should be equal to M0 for all the pixels, and calculate a correction in a direction such that this average does not deviate from M0. In a recursive average calculation process, it may be simpler to establish this difference indirectly from the corrected signals rather than from the received signals; in this case, the recursive calculation is done by storing the estimated average deviation in a register and by progressively correcting this deviation in a direction tending to bring M0 toward the average of the corrected signals. This is done by subtracting from the estimated deviation stored in the register a small fraction of the difference between the value of the corrected signal and the average M0.

Figure 2:
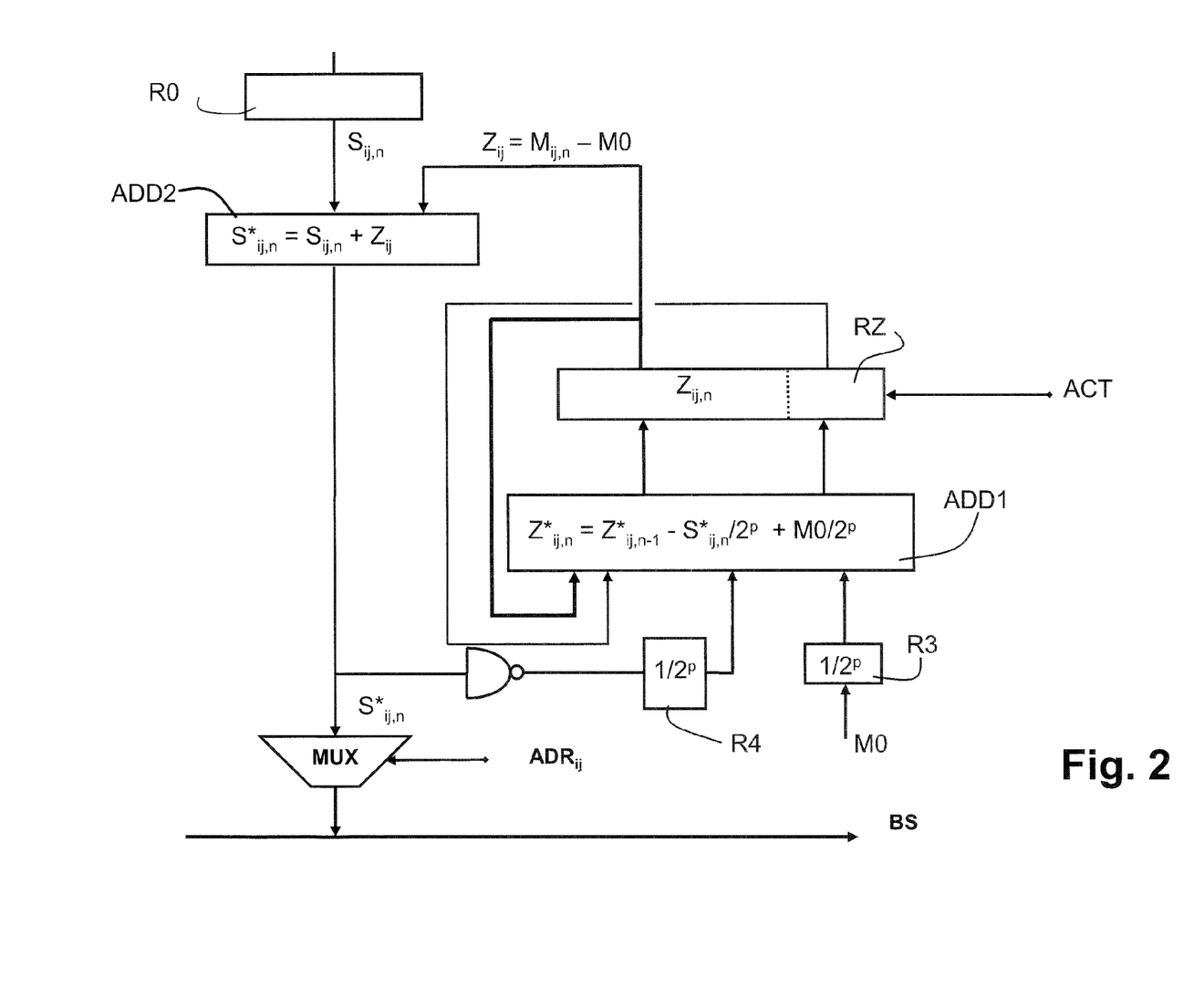
FIG. 2 represents an alternative circuit in which the recursive calculation is done based on the signals corrected by an estimation of the average deviation.

This is what is done in the embodiment of FIG. 2. The circuit represented is the one associated with the pixel $P_{ij}$ and there are as many circuits similar to this as there are pixels.

As in FIG. 1, the signals $S_{ij,n}$ obtained from the pixels arrive via an input register R0 and the corrected signals $S^*_{ij,n}$ are sent through a multiplexer MUX to an output bus BS. The multiplexer is controlled by an address bus to send the signal $S^*_{ij,n}$ corresponding to the pixel $P_{ij}$ only if the address $ADR_{ij}$ of this pixel is applied to the multiplexer.

A register RZ, with a finer resolution than the binary resolution of the signals $S_{ij,n}$, is used to establish and store on each new image an estimation $Z_{ij}$ of the average deviation. If a parallel is drawn with the embodiment of FIG. 1, this value $Z_{ij}$ represents the correction that must be applied to the signal $S_{ij,n}$ for its average to change from it real value $M_{ij}$ to the reference value M0.

More specifically, the recursive operation on $Z_{ij}$ consists in obtaining a new estimation $Z_{ij,n}$ on the nth image by subtracting from the preceding estimation $Z_{ij,n-1}$ a small fraction 1/A of the difference between the corrected signal and the desired value M0 for the average of the corrected signals $S^*_{ij}$.

Thus, the recursive equation is as follows, with $A = 1/2^p$:

$$Z_{ij,n} = Z_{ij,n-1} + M0/2^p - S^*_{ij,n}/2^p$$

This estimation of deviation tends progressively toward $M0 - M_{ij}$ and stabilizes there, with a filtering time constant that becomes all the longer as p increases.

The correction of the signal $S_{ij}$ then consists in adding to the signal the value $Z_{ij}$ representing the deviation between the average of the uncorrected signals and the desired average of the corrected signals.

The diagram of FIG. 2 therefore includes an adder ADD1 to establish the recursive calculation and an adder ADD2 to establish the corrected signal.

The adder ADD2 receives, on the one hand, the signal $S_{ij,n}$ obtained from the register R0 and, on the other hand, the output from the register RZ (only the high order outputs corresponding to the same resolution as the signal $S_{ij}$, not the low order outputs used only to perform the recursive addition).

The adder ADD1 receives three inputs:
the output from the register RZ (high order and low order)
the output from the register R3 containing the value $M0/2^p$, that is, containing the value M0, but offset to the right by p bits before being applied to the register
and the output from a register R4 containing the value $-S^*_{ij,n}/2^p$, that is, the opposite of the corrected signal $S^*_{ij,n}$ but offset to the right by p bits.

An inverter is symbolically represented between the signal $S^*_{ij,n}$ leaving the adder ADD2 and the register R4, to perform the operation involving calculating the opposite $-S^*_{ij,n}$ of the signal $S^*_{ij,n}$.

As in FIG. 1, the register RZ is controlled by an updating signal ACT, activated for example at the end of an exposure time, for all the pixels at once.

Additive Correction by a Median Between Extremes

Another way of calculating a correction of the signal obtained from the pixel consists in comparing the average between two extreme luminance values received by a pixel during the course of N successive images to a theoretical set point value M0 common to all the pixels.

It is therefore considered that the average signal level that a pixel supplies, and which represents an average luminance level, is the half-sum between the weakest signal received by a pixel and the strongest signal received by that pixel. Also, according to the invention, it is considered that all the pixels should receive at least once a very weak luminance level which is the same for all the pixels and a very high luminance level which is the same for all the pixels; and it is also considered that the half-sum of these luminances represents an average luminance level that should be the same for all the pixels.

The proposed correction, which is approximate but advantageous, then consists in considering that the half-sum of the weakest signal $S_{ij}$min and of the strongest signal level $S_{ij}$max supplied by a pixel should be a reference value M0 that is identical for all the pixels. If this is not the case, an additive correction is done to subtract from the received signal the difference between the observed half-sum and the reference value M0.

The corrected signal is then $$S^*_{ij,n} = S_{ij,n} + M0 - (S_{ij}\text{min} + S_{ij}\text{max})/2$$

The minimum and maximum values are obtained by a recursive calculation so that this calculation can be performed in a small circuit associated with each pixel.

The evaluation of the minimum and maximum values of the signal received by a pixel can be done simply by comparing the value of the received signal to that of a minimum value register and a maximum value register. The content of the minimum value register is replaced by the value of the signal if the latter is smaller than the content of the register; otherwise, the register remains unchanged. The content of the maximum value register is replaced by the value of the signal if the latter is greater than the content of the register; otherwise, the register remains unchanged.

However, as indicated hereinbelow, it may be preferable to do a more sophisticated recursive calculation that minimizes the impact of aberrant dots on the minimum or maximum value detected. Also, it may be desirable to provide for the stored extreme values, for each pixel, to tend naturally to be progressively brought toward one another, to take account of these aberrant dots and to take account of progressive drifts, temperature variations, etc.

The calculation that follows shows how it is possible to recursively calculate and store corrected extreme values, in place of the true extreme values, to take account of this.

Recursive Calculation of Corrected Extreme Values

The calculation will be demonstrated with regard to the maximum value of the signal received by the pixel. An identical calculation could be done for the minimum value.

$S_{ij}$maxc denotes the corrected extreme value, stored in a register and used to correct the current signal instead of the true extreme value $S_{ij}$max which could be detected. Similarly, $S_{ij}$minc is the corrected minimum extreme value, stored in another register.

If the current signal $S_{ij,n}$ of an image is greater than the stored value, the stored value is modified to add to it a fraction 1/B of the difference between the current value and the stored value, and not all of this difference as would be done if the aim was to store the true extreme value. The value of B meets criteria similar to those of the number A that was defined hereinabove: large enough to eliminate the impact of aberrant dots, not too large so as not to generate an excessively great establishment time constant at the outset. B can be chosen typically to be between 1 and $2^8$.

If, however, the current signal is less than the stored value, a small value is subtracted from the content of the register, preferably a value $(S_{ij}\text{maxc}-S_{ij}\text{minc})/A$ so that the content of the register is progressively reduced if the overshoot of its value occurs only rarely. The value A can be the same as that indicated hereinabove with regard to the recursive average value calculation: typically between $2^8$ and $2^{14}$.

Thus, the impact of an aberrant dot will only be limited, and then only if high values are reproduced often enough for them to finish up defining a maximum value to be stored. Otherwise, the stored extreme value is reduced slowly (time constant of a few minutes if A is equal to $2^{12}$ to $2^{14}$ for 50 images per second).

The content of the register does not therefore truly represent a detected extreme value, but a kind of recurrent high value reached often enough by the pixel and which, for the purposes of correcting and eliminating the fixed image noise, is perfectly useable.

Similarly, a low value register would contain a kind of recurrent low value reached often enough by the pixel.

Since these high and low values $S_{ij}$max and $S_{ij}$minc are obtained by the same calculation for all the pixels, it will be understood that they can statistically serve as a basis for correcting the dispersions of the pixels instead of the true extreme values.

Correcting a pixel then consists in applying the following formula:

$$S^*_{ij,n} = S_{ij,n} + M0 - (S_{ij}\text{minc} + S_{ij}\text{maxc})/2$$

Multiplicative Correction by Luminance Slope Deviation

In addition to the average of the time distribution, provision can be made to use a second statistical characteristic of the time distribution of the signals obtained from a pixel. More specifically, it is possible now to try to apply a multiplicative correction to the value of the signal. This multiplicative correction is preferably done after additive correction of the signal by the average value, by applying a gain $G_{ij}$ to the corrected signal from the pixel $P_{ij}$, or more precisely to the difference between the corrected signal $S^*_{ij}$ and the desired average M0.

Thus, if a corrected signal $S^*_{ij,n}$ has been established from the current signal, using the formula $S^*_{ij,n} = S_{ij,n} + M0 - M_{ij}$, a doubly corrected signal $S^{}_{ij,n}$ will now be established such that $$(S^{}_{ij,n} - M0) = G_{ij}(S^*_{ij,n} - M0)$$

The above formula is given generally. If the signals are coded positively and negatively about an average value M0 taken by definition to be equal to zero, this operation is a simple multiplication of the signal by the gain $G_{ij}$. If, however, the average M0 is not a zero reference, the complete formula must be used and this multiplicative correction of the signal $S^*_{ij}$ of course also includes an additive term which is equal to $M0[1-G_{ij}]$.

The gain $G_{ij}$ to be applied is calculated from the observation of an average slope of variation of the signal according to the luminance. If the pixels have different slopes of variation, then there will be a fixed noise pattern linked to the particular features of the individual pixels. It is therefore desirable to determine the average slope, to determine its deviation relative to a reference slope, and to correct the signal by applying a gain corresponding to the ratio between the desired slope and the observed real slope.

The desired slope and the observed slope can be determined mainly in two ways:

by observing the deviation between extremes $S_{ij}\text{max}-S_{ij}\text{min}$, or even the deviation between corrected extremes $S_{ij}\text{maxc}-S_{ij}\text{minc}$, the values $S_{ij}\text{maxc}$ and $S_{ij}\text{minc}$ being calculated as indicated previously in the section entitled "Calculation of corrected extreme values"

or else by observing the standard deviation of the signals obtained from the pixel during a large number of images.

In these two methods, if the observed deviation is $E_{ij}$ and the theoretical set point deviation is E0 (the same for all the pixels), the gain to be applied is $E0/E_{ij}$.

Figure 3:
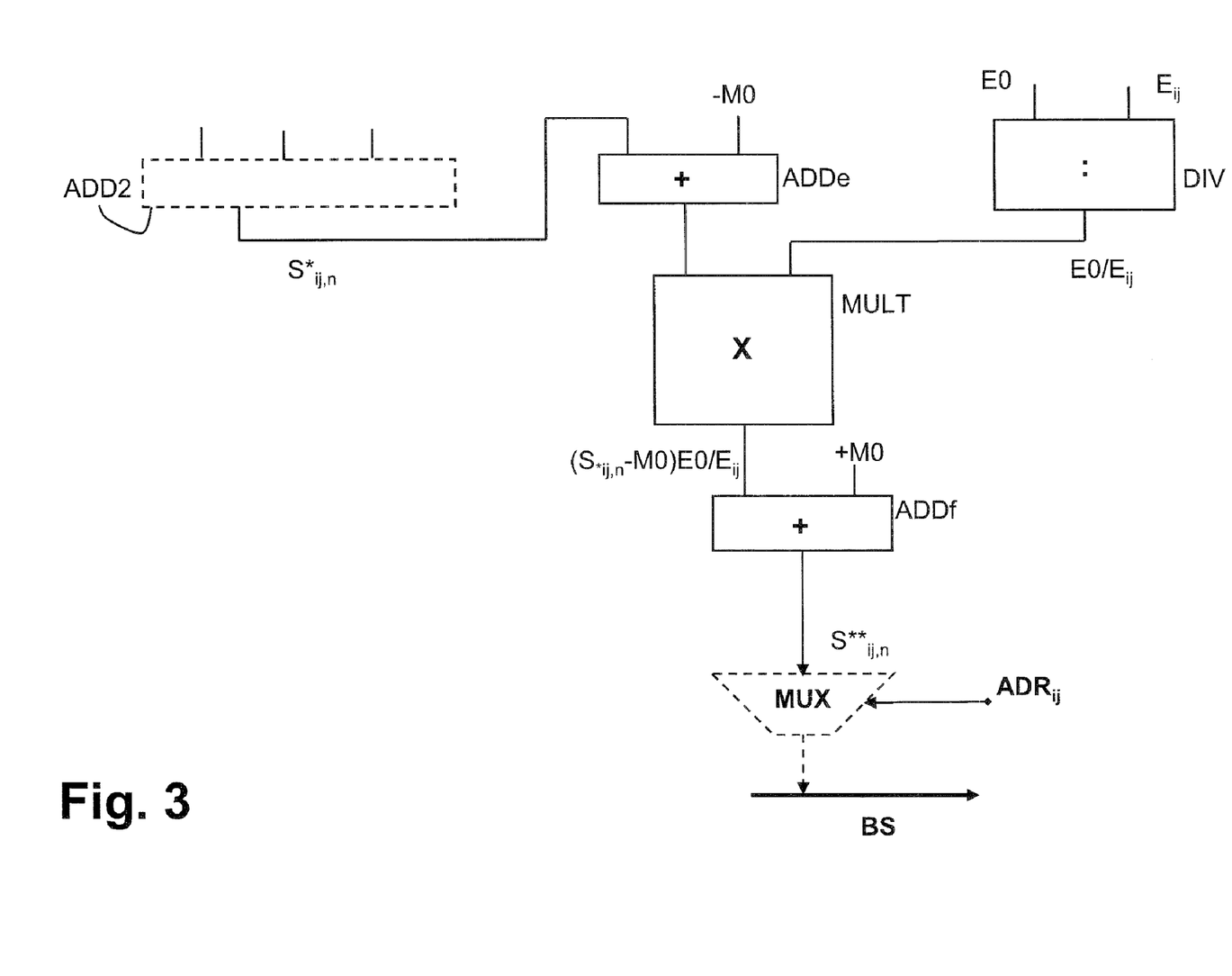
FIG. 3 represents a portion of an additional circuit for applying a multiplicative correction.

FIG. 3 represents the associated circuit diagram inserted between the adder ADD2 of FIG. 1 (or 2) and the multiplexer MUX to establish the signal $S^{**}_{ij,n}$ from a multiplicative correction of the signal $S^*_{ij,n}$. A divider DIV performs the division $E0/E_{ij}$. A multiplier MULT multiplies the result by the quantity $(S^*_{ij,n} - M0)$. An adder ADDe produces the latter quantity, and an adder ADDf adds the result of the multiplication to M0 to produce the corrected signal $S^{**}_{ij,n}$.

The following paragraphs explain how the value $E_{ij}$ can be determined in an electronic circuit associated with the pixel by using the two methods.

Calculating the Slope Deviation from an Estimation of Standard Deviation

It will be recalled that the standard deviation is the square root of the variance $V_{ij}$, and that the variance of the signal obtained from the pixel $P_{ij}$ is the root mean square of the deviations between the value of the signal and its average $M_{ij}$. The variance is also the deviation between the root mean square of the signal and the square of the simple average of the signal.

It would not be easy to calculate the true variance or the true standard deviation in a small circuit associated with the pixel. However, an approximate value can be found by proceeding in a recursive manner, similar to that used for the average value estimation.

The recursive calculation of the variance can be as follows:

The recursive average $M_{ij}$ is calculated as indicated previously. An average of the squares is also calculated by this same method, in which the value of the current signal $S_{ij,n}$ is replaced by the square of this signal $(S_{ij,n})^2$.

The average of the squares is then $Q_{ij}$, obtained by the recurrence $$Q_{ij,n} = Q_{ij,n-1} + [(S_{ij,n})^2 - Q_{ij,n-1}]/A$$

A can have the same value as for the calculation of the simple average $M_{ij}$.

The variance is then:

$V_{ij} = Q_{ij} - (M_{ij})^2$ in which $Q_{ij}$ is the last value obtained for the average of the squares.

The standard deviation $E_{ij}$ can be obtained by successive approximation as is often done to determine the square root: $E_{ij}$ is the number such that $V_{ij}^2 = E_{ij}$.

The values $Q_{ij}$ and $M_{ij}^2$ are positive values coded on at least 24 bits if the amplitude of the signal is coded on 12 useful bits, but they must be generated from registers having a greater number of bits because of the recursive method using a number A, failing which the recursive method could not work.

These calculations are implemented by a circuit comprising not only capabilities of addition, subtraction and division by a power of two, as in FIGS. 1 and 2, but also multiplications (raising by the power of two).

It will be noted that it may be desirable to provide for the standard deviation to be limited to a bottom floor value (in other words, it cannot fall below a certain value). Without this, there would be a risk that the gain to be applied might be too high in cases of pixels that have a signal variation slope that is particularly shallow according to the luminance.

The signal that is doubly corrected, additively and multiplicatively, is then:

$$S^{**}_{ij,n} = (E0/E_{ij}) \cdot S^{*}_{ij,n} + [1 - (E0/E_{ij})] \cdot M0$$

therefore $$S^{**}_{ij,n} = (E0/E_{ij})[S_{ij,n} + M0 - M_{ij}] + [1 - (E0/E_{ij})] \cdot M0$$

or else:

$$S^{**}_{ij,n} = (E0/E_{ij}) \cdot S_{ij,n} - (E0/E_{ij}) \cdot M_{ij} + M0$$

It will be understood that it would of course be possible to reverse the multiplicative correction and additive correction operations, by directly multiplying the signal $S_{ij,n}$ obtained from the pixel by the gain $E0/E_{ij}$, the single additive correction then being equal to $M0 - (E0/E_{ij}) \cdot M_{ij}$.

The circuit associated with the pixel then comprises the elements needed to perform not only additions and subtractions but also multiplications and divisions.

Calculating the Slope Deviation from an Estimation of the Deviation Between Extremes Particularly (but not solely) in the case where the approximate average has been obtained from a determination of the deviation between extremes, to establish an additive correction compensating the average deviations, it is possible to consider using the knowledge of this deviation to make a multiplicative correction. In practice, this deviation is also representative of a slope of variation according to the luminance: if the deviation varies between two pixels, when all the pixels should statistically see the same extreme luminances after a certain number of images, this means that their slopes of variation according to the luminance are not the same.

The additive and multiplicative correction calculation formula to be applied is the same as in the preceding section:

$$S^{**}_{ij,n} = (E0/E_{ij}) \cdot S_{ij,n} - (E0/E_{ij}) \cdot M_{ij} + M0$$

by replacing the standard deviation $E_{ij}$ with the deviation $S_{ij}\text{max} - S_{ij}\text{min}$ between extremes, or else by the deviation between corrected extremes $S_{ij}\text{maxc} - S_{ij}\text{minc}$, the values $S_{ij}\text{maxc}$ and $S_{ij}\text{minc}$ being calculated as indicated previously in the section entitled "Calculation of corrected extreme values".

The reference standard deviation E0 must of course also be replaced by a deviation between reference extremes.

Here too, it may be desirable to give a floor value to the deviation between extreme values (corrected or uncorrected). In other words, if the observed deviation (corrected or uncorrected) is too small, it is replaced by the floor value to make the gain calculation. This avoids applying too great a gain for pixels that have too shallow a slope of signal variation according to the luminance.

Multiplicative Correction from the Median Value Between Extremes

In the combined additive and multiplicative correction culminating in a corrected signal $S^{**}_{ij,n} = (E0/E_{ij}) \cdot S_{ij,n} - (E0/E_{ij}) \cdot M_{ij} + M0$, it was considered that the average $M_{ij}$ was the average obtained by direct recursive calculation with a scheme such as that in FIGS. 1 and 2. However, it can be replaced by the median value between extremes as was done for a simple additive correction: see the previous section entitled "Additive correction by a median value between extremes". Of course, it is also possible to use the corrected extreme values rather than the true extreme values.

Implementing the Correction at Pixel Level

The diagrams of FIGS. 1 and 2 presuppose that the signal $S_{ij}$ to be corrected arrives in an input register R0 in digital form, in order to be digitally corrected. This digital signal can originate from an analogue-digital conversion, in the pixel or in the correction circuit associated with the pixel, of a current or of an analogue voltage obtained from the photodetector.

Hybrid circuit architectures can enable it to be done, for example, with a photosensitive pixel on a chip facing an electronic processing circuit on another chip. The chips are placed one against the other and direct electrical connections are established between a pixel and its associated calculation circuit. It would also be possible to envisage having both the analogue-digital conversion and the correction calculation performed in the pixel itself, technology permitting, provided that there is sufficient space available to house the electronic correction calculation circuits in the available space allotted to each pixel.

The digital signal obtained from the pixel can also be obtained by direct digital counting of charge or pulse quantities: for example, a photodetecting element can be made which supplies a charge current, which is converted into pulses with a frequency that is proportional to the lighting. A counter, in the pixel, counts the pulses during the exposure time, so that the content of the counter represents, directly in digital form, the lighting dose received during the exposure time. It is this content that then constitutes the signal $S_{ij}$ obtained from the pixel, to be corrected by the associated correction circuit. The register R0 of FIGS. 1 and 2 can then quite simply be this counter.

It is even possible to provide for the register R0 and the adder ADD2 of FIG. 2 to be replaced by a single counter which counts the lighting dose: the content of the counter would then be loaded at the start of measurement with the value $Z_{ij}$ then it would be incremented by the lighting counting pulses proportional to the current from the photodetector until the end of the exposure time. At the end, the content of the counter will have carried out the desired addition.

$$S^*_{ij,n}=S_{ij,n}+Z_{ij}$$

The invention claimed is:

1. A method of processing signals obtained from pixels of a matrix image sensor, this method comprising the following steps:
   the signal ($S_{ij,n}$) obtained from each pixel is collected during a large number of successive images;
   for each pixel, in an individual electronic circuit associated with the pixel, a recursive digital method is used to determine an approximate value of an average of the signal obtained from the pixel during this large number of images;
   the signal obtained from each pixel is instantaneously corrected according to the determined approximate average value and according to a reference average value common to all the pixels,
   a corrected signal is transmitted from the circuit associated with the pixel.

2. The processing method as claimed in claim 1, wherein an approximate average value is obtained by adding to a previously obtained average a fraction of the deviation between the value of the current signal (Sij,n) corresponding to an image and the average previously obtained from the preceding images.

3. The processing method as claimed in claim 1, wherein the corrected signal is obtained by adding to the current signal the difference between the reference average value and the calculated average.

4. The processing method as claimed in claim 1, wherein an estimation of the average deviation is calculated recursively and this estimation is added to the current signal to obtain a corrected signal, the recursive calculation of the estimation being performed by adding to a previously calculated estimation a fraction of the difference between the reference average value and the corrected signal.

5. The processing method as claimed in claim 1, wherein the approximate average value calculated recursively is a median between high and low limit values taken by the signal obtained from the pixel during the large number of images, and the correction of the signal obtained from the pixel is an additive correction comprising the addition to this signal of the difference between the average value calculated in this way and the reference average value.

6. The processing method as claimed in claim 5, wherein the high limit value is obtained recursively by the following algorithm:
   if the value of the signal from the pixel for the current image is greater than the high limit value, the high limit value is modified to add to it a fraction of the difference between the value of the signal and the limit value;
   if the value of the signal from the pixel is less than the high limit value, a fraction of the difference between the high and low limit values is subtracted from the high limit value.

7. The method as claimed in claim 1, wherein the corrected signal is modified by applying to it a multiplicative correction comprising a multiplying coefficient which modifies the slope of variation of the signal according to the luminance, the multiplying coefficient being the ratio between a reference deviation and the deviation observed between the high and low limit values.

8. A matrix image sensor, comprising, for each pixel, an individual digital circuit associated with the pixel, this individual circuit comprising means for recursively calculating an approximate value of an average of the signal obtained from the pixel during a large number of preceding images, means for correcting the signal obtained from the pixel according to the determined approximate average value and according to a reference average value common to all the pixels, and means for transmitting a corrected signal from the circuit associated with the pixel.

9. The matrix image sensor as claimed in claim 8, wherein the associated individual circuit and an individual photodetector supplying the signal to be corrected are placed in one and the same area within a matrix of pixels.

10. The matrix image sensor as claimed in claim 8, wherein the associated individual circuit is placed in a matrix of associated circuits separate from a matrix of individual photodetectors supplying the signal to be corrected, the signals to be corrected obtained from the pixels of the matrix being sent individually to each respective associated circuit.

* * * * *